July 12, 1949.  T. L. GAGNON  2,475,606
TURNBUCKLE WRENCH
Filed Nov. 14, 1945

INVENTOR
THEODORE L. GAGNON
BY
Ralph L Chappell
ATTORNEY

Patented July 12, 1949

2,475,606

UNITED STATES PATENT OFFICE 2,475,606

TURNBUCKLE WRENCH

Theodore L. Gagnon, Seekonk, Mass.

Application November 14, 1945, Serial No. 628,633

1 Claim. (Cl. 81—57)

(Granted under the act of March 3, 1883, as amended April 30, 1928; 370 O. G. 757)

This invention relates to a wrench for tightening and loosening turnbuckles, and is illustrated herein as embodied in a gear-operated wrench suitable for operating a turnbuckle at a distance therefrom.

Many cables, particularly control cables of aircraft and cables used as tension members for strengthening and supporting structures are equipped with turnbuckles for use in adjusting the tension within the cables. Where a turnbuckle is in a relatively open space it can be adjusted simply by attaching a wrench or inserting a screw driver or nail within the sleeve of the turnbuckle and turning while holding the bolts thereof stationary. However, many turnbuckles are located in relatively inaccessible places behind panels and outer coverings of aircraft behind which the cables must pass to reach control surfaces. The adjusting of such aircraft cable turnbuckles has to be done accurately and expeditiously, but where the cables are relatively inaccessible much time must be spent in adjusting difficulty reached turnbuckles.

Therefore, it is an object of this invention to provide a wrench for operating a turnbuckle, which wrench can be operated at a distance from the turnbuckle.

Accordingly, this invention provides a turnbuckle wrench which includes a pair of gears and means associated with one of the gears for attaching it to the sleeve of a turnbuckle. The other gear is rotated to drive the first gear to cause it to operate the turnbuckle, and the second gear may be rotated from a relatively remote point.

As another feature of this invention, clamping means is provided in combination with said gears and operating means for holding the bolts of the turnbuckle against rotation while the turnbuckle sleeve is turned.

With the above and other objects and features in view, the invention will now be described with reference to the accompanying drawing which illustrates a preferred embodiment of the invention and will be pointed out in the claims.

Figures 1, 2:
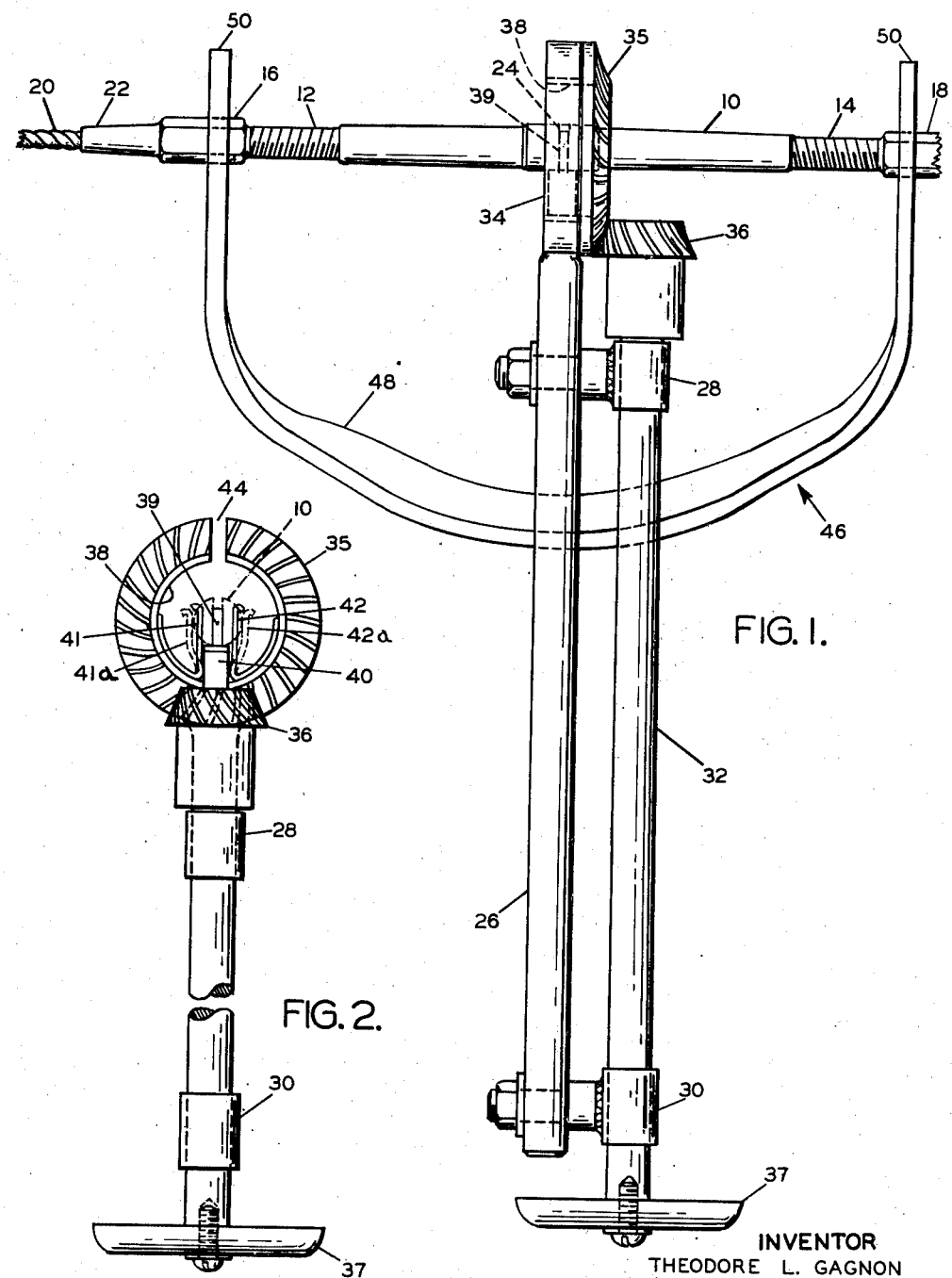
Fig. 1 is a side elevational view of a turnbuckle wrench and clamp constructed in accordance with this invention, the wrench and clamp being shown attached to a turnbuckle and ready for operation.
Fig. 2 is a plan view of the wrench shown in Fig. 1.

In Fig. 1 a turnbuckle is shown which includes a central rotatable section or sleeve 10 which is threaded to bolts 12 and 14. The bolts 12 and 14 are threaded reversely in opposite directions to permit them to be drawn toward one another or forced away from each other when the sleeve 10 is rotated. The bolts 12 and 14 are provided with hexagonal heads 16 and 18. The ends of a cable 20 are attached to the heads 16 and 18 of the turnbuckle bolts by means of a pressed connection 22 associated with the head 16 and a similar pressed connection (not shown) associated with the head 18.

The center of the sleeve 10 is provided with an opening 24 into which a pin or nail can be inserted to turn the sleeve. As shown, the opening 24 is a small circular opening bored radially through the turnbuckle sleeve.

The turnbuckle illustrated is of a type common to aircraft but it should be borne in mind that this invention is not limited in scope to use with a turnbuckle having a sleeve of this type but that the broad principle of the invention can be adapted for use with turnbuckles having sleeves and bolts of varying characteristics.

A turnbuckle wrench, made according to this invention, is shown in Fig. 1 attached to the turnbuckle. A cylindrical rod 26 forms a framework about which the wrench is built. A pair of spaced bearings 28 and 30 in which a second rod 32 rotates are firmly attached to the rod 26. The rod 32 is supported parallel to rod 26 by the bearings. At one end of the rod 26 is firmly attached an annular circular bearing 34, having its axis at right angles to the axis of rod 26, in which a beveled gear 35 turns. A second beveled gear 36, which cooperates with the gear 35, is attached to the end of the rod 32 coaxially therewith. Thus, when the rod 32 is turned, the gears 36 and 35 are turned by it. A handle 37, attached to the end of the rod 32 away from the gear 36, is used to turn the rod 32 and the gears 36 and 35. A circular collar 38 attached to one side of the gear 35 (left side in Fig. 1) fits inside the bearing 34 and holds the gear 35 in place with respect to the bearing 34. The gears may be of any of the common types of beveled gears and may be equipped with radial teeth. However, for best operation, helical gears having curved non-radial teeth are used, as indicated in the drawing.

As shown in Fig. 2, a radially extending pin 39 is attached to the interior of the gear 35 and turns with it. The pin 39 is of the same size as and is adapted to be inserted in the opening 24 in the sleeve of the turnbuckle. An enlarged section 40 of the pin 39 adjacent to the gear 35 acts as a stop to limit the distance the pin 39 can be inserted into the sleeve opening. Two spring inserts 41 and 42 are provided in association with the pin 39. The spring inserts are attached to the interior surface of the gear 35 and turn with the gear 35 and the pin 39. The inserts are constructed to spring outwardly about the turnbuckle sleeve 10 when the pin 39 is inserted in the opening 24, as clearly indicated by dotted lines in Fig. 2 at 41a and 42a, to hold the sleeve in place with relation to the pin 39 and the wrench structure.

The gear 35 and the bearing 34 are provided with a slot indicated at 44. When the wrench is to be placed upon the sleeve of a turnbuckle, the cable 20 is passed through the slot 44 as the wrench is advanced into place. The advantage of the use of helical gears is most apparent with respect to the slot 44. As the gears are rotated, the helical teeth easily bridge the slot 44, while when simple radial teeth are used they tend to slip when passing the slot 44.

As shown in Fig. 1, the bolts of the turnbuckle are held against rotation during the operation of the wrench by means of a clamp 46, which may be of any of the usual types of clamps used for holding turnbuckle bolts and has a curved handle 48 at either end of which is a gripping section 50 constructed to grip the head of one of the turnbuckle bolts.

The operation of this wrench is relatively simple. The cable 20 is passed through the slot 44 in the gear 35 and the bearing 34, and the wrench is moved along the cable and the turnbuckle until the pin 39 can be inserted in the opening 24 of the sleeve 10. The clamp 46 is attached to the hexagonal heads 16 and 18 of the turnbuckle bolts. Then, while the clamp 46 is held against movement, the wheel 37 is turned to rotate the gears and operate the turnbuckle.

The wrench as illustrated is provided with a pin for inserting within the sleeve 10 in the turnbuckle. However, this invention should not be construed as limited in application only to turnbuckles having a sleeve opening which accommodates a pin. Other types of fastening devices can be associated with the gears of the wrench for use with turnbuckles having other types of attaching means. For example, for use with a turnbuckle sleeve of hexagonal shape, a gripping device of cut-away hexagonal shape may be used instead of the pin 39.

The illustrated wrench can be used to tighten or loosen a turnbuckle by an operator at some distance therefrom. The wrench can easily be inserted through an inspection opening in an airplane panel to reach a turnbuckle at some distance beyond the opening. Thus, turnbuckles located at inaccessible places behind panels and outer coverings of aircraft can easily be operated with its aid. Moreover, with the aid of this device, turnbuckles which are located close to surfaces which would interfere with other devices for turning a turnbuckle sleeve can easily be operated with it for the wrench can be used to turn a sleeve a complete revolution or more while only a part of the gear 35 extends behind the turnbuckle instead of a long handle as would be required with the usual devices used for operating turnbuckles.

The invention described herein may be manufactured and used by or for the Government of the United States of America for government purposes without the payment of any royalty thereon or therefor.

Having described my invention what I claim as novel and desire to protect by Letters Patent of the United States is:

A wrench for turning the sleeve of a turnbuckle comprising, a rod-like handle, an annular circular bearing secured to said handle, a first annular bevel gear rotatably journalled in said bearing, said bearing and said first gear having a radial slot therein of a width less than the diameter of said turnbuckle sleeve, said first gear and said bearing being adapted to encircle said sleeve, a pin secured to said first gear and extending radially inward therefrom a distance substantially equal to the radius of said first gear, said pin at the unsecured end thereof being of such a diameter as to fit into an opening in said sleeve, said pin being of a larger diameter adjacent said gear whereby the distance of insertion of said pin into said sleeve is limited and said sleeve maintained substantially concentric with said first gear, a pair of resilient clamping springs secured to the inner periphery of said first gear and extending radially inward therefrom a distance substantially equal to the length of said pin and in juxtaposition therewith, said clamping springs cooperating with said pin to grip said sleeve and retain it upon said pin, a second gear rotatably mounted on said framework with the axis thereof perpendicular to the axis of said first gear and meshing therewith, a shaft secured to said second gear and mounted on said handle parallel therewith, and means on said shaft for rotating said second gear to drive said first gear.

THEODORE L. GAGNON.

REFERENCES CITED

The following references are of record in the file of this patent:

UNITED STATES PATENTS

| Number | Name | Date |
|---|---|---|
| 682,384 | McFarland | Sept. 10, 1901 |
| 1,397,810 | Johnson | Nov. 22, 1921 |
| 2,295,720 | Dietzmann et al. | Sept. 15, 1942 |
| 2,360,019 | Ryan et al. | Oct. 10, 1944 |